3,792,006
WATER EXTENDED VINYL ESTER RESINS
Daniel J. Najvar, Lake Jackson, Tex., assignor to The Dow Chemical Company, Midland, Mich.
No Drawing. Continuation of abandoned application Ser. No. 762,344, Sept. 16, 1968. This application Sept. 21, 1971, Ser. No. 182,531
Int. Cl. C08f 45/24, 43/02
U.S. Cl. 260—29.6 NR                16 Claims

ABSTRACT OF THE DISCLOSURE

Water extended thermosettable resin compositions are prepared by forming stable water-in-resin emulsions with vinyl ester resins, certain modified vinyl ester resins and vinyl ester/unsaturated polyester resin compositions. The resin phase contains from 30 to 60 percent by weight of an essentially water insoluble monomer copolymerizable with said resins. The emulsions are prepared to contain from 30 to 70 percent by weight water. The novel water-in-resin emulsions are prepared without the need for an emulsifying agent. The vinyl ester resins employed are compounds containing a plurality of terminal unsaturated acid ester groups obtained by reaction of compounds having a plurality of oxirane groups with alpha, beta-unsaturated carboxylic acids.

This is a continuation of application Ser. No. 762,344 filed Sept. 16, 1968, now abandoned.

BACKGROUND OF THE INVENTION

This invention relates to novel water extended thermosettable resin compositions comprising stable water-in-resin emulsions. Further the invention relates to vinyl ester resins to certain modified vinyl ester resins and to vinyl ester/unsaturated polyester resin compositions.

Thermosettable resins are usually admixed with a variety of additives, fillers, reinforcing materials and the like to modify the properties of the thermoset resin, improve the handling characteristics of the uncured formulated resin, improve the economics, etc. Reactive diluents and particularly polymerizable monomers have been admixed for these purposes when utilizing such thermosettable resins as unsaturated polyesters and the newer vinyl ester resins.

There has long been a desire to utilize water as an additive or resin extender for the obvious economic reasons, but also because water offers the possibility of being able to cure thermosettable resins in large or massive articles without the exothermic heat of curing causing breaks and cracks in the article, provided that a sufficient amount of water can be combined in a stable manner with the resin to act as a heat sink and that the physical properties of the cured article are not adversely affected. This goal is further complicated when it is also desired to use a polymerizable monomer in conjunction with the water extended resin. However, attempts to use water as an extender have not been satisfactory since the available thermosettable resins do not emulsify readily and these water-in-resin emulsions that do form are relatively unstable.

SUMMARY OF THE INVENTION

It has now been found that a stable, uniform water-in-resin emulsion of certain thermosettable resins can be prepared without the need of an emulsifying agent. More particularly, the invention relates to water extended vinyl ester resins, certain modified vinyl ester resins and to vinyl ester/unsaturated polyester resin compositions wherein said resins are the continuous phase in said emulsions.

The water-in-resin emulsions comprise from about 30 to 70 weight percent of water and from about 70 to 30 weight percent of a thermosettable resin phase wherein the resin phase comprises about 40 to 70 weight percent of a vinyl ester resin and from 60 to 30 weight percent of a monomer copolymerizable therewith. The vinyl ester resin is characterized by having

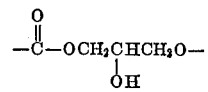

linkage groups and terminal vinylidene groups.

The invention further contemplates modification of the vinyl ester resin by reaction of about 0.1 to 0.6 moles of a dicarboxylic acid anhydride per equivalent of hydroxyl group. Additionally, the vinyl ester resin portion of the resin phase may be replaced by a vinyl ester/unsaturated polyester resin composition wherein the weight ratio of said polyester to said vinyl ester resin may range up to about 2:3.

The emulsion is cured by adding free radical yielding catalysts and heating or by adding curing promoters if curing at ambient temperature is desired. The cured emulsions are hard infusible solids which are flame resistant, do not lose any appreciable amount of water upon standing, and can be readily nailed, sawed, drilled, etc. similar to wood and other like substances. Prior to curing, the catalyzed material may be mixed with inert fillers such as sand, clay, etc., as well as reinforcing materials such as glass fibers and with other inert additives.

DETAILED DESCRIPTION OF THE INVENTION

The vinyl ester resins which have the unexpected property of forming a stable water-in-resin (water extended resin) emulsion without an emulsifying agent are generally prepared by the interaction of about equal equivalent proportions of a polyepoxide resin and an unsaturated monocarboxylic acid where

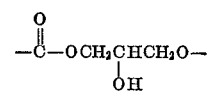

linkages are formed and the resulting resin has terminal vinylidene groups.

Vinyl ester resins are described in U.S. 3,367,992 wherein dicarboxylic acid half esters of hydroxyalkyl acrylates or methacrylates are reacted with polyepoxide resins. Bowen in U.S. 3,066,112 and 3,179,623 describes the preparation of vinyl ester resins from monocarboxylic acids such as acrylic and methacrylic acid. Bowen also describes alternate methods of preparation wherein a glycidyl methacrylate or acrylate is reacted with the sodium salt of a dihydric phenol such as bisphenol A. Vinyl ester resins based on epoxy novolac resins are described in U.S. 3,301,743 to Fekete et al. Fekete et al. also describes in U.S. 3,256,226 vinyl ester resins wherein the molecular weight of the polyepoxide is increased by reacting a dicarboxylic acid with the polyepoxide resin as well as acrylic acid, etc. Other difunctional compounds containing a group which is reactive with an epoxide group, such as an amine, mercaptan, and the like, may be utilized in place of the dicarboxylic acid. All of the above described resins contain the characteristic linkages

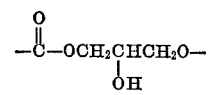

and terminal, polymerizable vinyliden groups, are classified as vinyl ester resins, and are incorporated herein by reference.

Briefly, any of the known polyepoxides may be employed in the preparation of the vinyl ester resins of this invention. Useful polyepoxides are glycidyl polyethers of both polyhydric alcohols and polyhydric phenols, flame retardant epoxy resins based on tetrabromo Bisphenol A, epoxy novolacs, epoxidized fatty acids or drying oil acids, epoxidized diolefins, epoxidized di-unsaturated acid esters as well as epoxidized unsaturated polyesters, so long as they contain more than one oxirane group per molecule. The polyepoxides may be monomeric or polymeric.

Preferred polyepoxides are glycidyl polyethers of polyhydric alcohols or polyhydric phenols having weights per epoxide group of about 150 to 2000. These polyepoxides are usually made by reacting at least about two moles of an epihalohydrin or glycerol dihalohydrin with one mole of the polyhydric alcohol or polyhydric phenol, and a sufficient amount of a caustic alkali to combine with the halogen of the halohydrin. The products are characterized by the presence of more than one epoxide group per molecule, i.e., a 1,2-epoxy equivalency greater than one.

Unsaturated monocarboxylic acids include acrylic acid, methacrylic acid, halogenated acrylic or methacrylic acid, cinnamic acid and the like and mixtures thereof, and hydroxyalkyl acrylate or methacrylate half esters of dicarboxyl acids as described in U.S. 3,367,992 wherein the hydroxyalkyl group preferably has from 2 to 6 carbon atoms.

The thermosettable resin phase comprises from 40 to 70 weight percent of the vinyl ester resin and from 60 to 30 percent of a copolymerizable monomer. Suitable monomers must be essentially water insoluble to maintain the monomer in the resin phase in the emulsion, although complete water insolubility is not required and a small amount of monomer dissolved in the emulsified water does no harm. The proportions of monomer are critical in that a resin phase which contains less than about 30% monomer or more than 60% monomer will not normally form stable emulsions containing about 50% or more water.

Suitable monomers include vinyl aromatic compounds such as styrene, vinyl toluene, halogenated styrenes, divinyl benzene and the like saturated alcohols such as methyl, ethyl, isopropyl, octyl, etc. esters of acrylic acid or methacrylic acid; vinyl acetate, diallyl maleate, dimethallyl fumarate; mixtures of the same and all other monomers which are capable of copolymerizing with the vinyl ester resin and are essentially water insoluble.

In the practice of this invention water-in-resin emulsions may be prepared in a variety of ways. Generally a free radical yielding catalyst is blended with the resin phase and then the water is admixed with the catalyzed resin phase under shearing conditions to form a water-in-resin emulsion. Preferably the water is added to the resin phase. While the shear conditions may vary widely, generally sufficient shear should be applied to produce a uniform emulsion of small particle size. It is not known why the vinyl ester resins emulsify so readily but it may well be due to the presence of the hydrophilic hydroxyl groups.

The proportions of water are also critical by reason that emulsions with less than about 30% water are unstable due to the low viscosity of the emulsion and also at low levels of water, large or massive castings will crack during curing due to steam pressure generated by the high exotherm. Water levels above about 70% detract too much from the physical properties of the cured article to be generally useful. Accordingly the water extended vinyl ester resin compositions (water-in-resin emulsions) are prepared to contain from about 30% to 70% by weight of water with the balance comprising the resin phase.

Not only do the vinyl ester resins emulsify readily with water without an emulsifying agent, but the water-in-resin emulsions produced have excellent stability. It is known to be very difficult if not impossible to form a stable unsaturated polyester-water emulsion even when using emulsifying agents. The emulsions usually break within a few hours or even minutes after preparation. Recently, some special unsaturated polyester resins of undisclosed composition have been made available which form water-in-resin emulsions, but generally these emulsions have comparatively poor stability and the cured product is deficient in one or more physical properties.

Catalysts that may be used for the curing or polymerization are preferably the peroxide catalysts such as benzoyl peroxide, lauroyl peroxide, t-butyl hydroperoxide, methyl ethyl ketone peroxide, t-butyl perbenzoate, potassium persulfate and the like. The amount of the catalyst added will vary preferably from 0.1 percent to about 5 percent by weight of the resin phase.

The emulsion preferably may be cured by heating to between about 160° to 200° F. although a wider range of curing temperatures may be used. Additionally, more rapid curing of the emulsions may be accomplished by the addition of accelerating agents or promoters such as lead or cobalt naphthanate, dimethyl aniline and the like usually in concentrations ranging from 0.1 to 5.0 weight percent. The promoted emulsion can be readily cured in about 3 to 30 minutes, depending on the temperature, the catalyst level and the promoter level. The common practice of post curing thermoset articles at elevated temperatures for varying periods of time may be utilized with this invention.

Another embodiment of this invention utilizes a modified vinyl ester resin wherein about 0.1 to 0.6 moles of a dicarboxylic acid anhydride per equivalent of hydroxyl is reacted with the vinyl ester resin. The stability of the water-in-resin emulsion prepared from said modified vinyl ester resin is somewhat less, comparatively, than that found with the unmodified vinyl ester resins, yet the stability is significantly improved over the art. Both saturated and unsaturated acid anhydrides are useful in said modification.

Suitable dicarboxylic acid anhydrides containing ethylenic unsaturation include maleic anhydride, the halogenated maleic anhydrides, citraconic anhydride, itaconic anhydride and the like and mixtures thereof. Saturated dicarboxylic acid anhydrides include phthalic anhydride, tetrabromophthalic anhydride, chlorendic anhydride, anhydrides of aliphatic unsaturated dicarboxylic acid and the like. The modified vinyl ester resin is utilized in this invention in the same manner as already described for the unmodified vinyl ester resin.

Yet, another embodiment of this invention utilizes a vinyl ester/unsaturated polyester resin composition wherein the weight ratio of said polyester to said vinyl ester ranges up to 2:3. The composition may be prepared either by physically mixing the two resins in the desired weight proportions or by preparing said vinyl ester resin in the presence of said unsaturated polyester. My previously filed copending application, Ser. No. 600,788 filed on Dec. 12, 1966 discloses the preparation of a vinyl ester resin in the presence of an unsaturated polyester and is incorporated herein by reference. Unexpectedly, these vinyl ester/unsaturated polyester resin compositions readily form water-in-resin emulsions in the same manner as previously described for the vinyl ester resins even though the unsaturated polyesters, alone, are incapable of forming stable emulsions.

Briefly, a wide variety of unsaturated polyesters which are readily available or can be prepared by methods well known to the art may be utilized in the preparation of the vinyl ester/unsaturated polyester resin compositions of this invention. Generally, in the preparation of suitable polyesters, an ethylenically unsaturated dicarboxylic acid such as maleic acid, fumaric acid, itaconic acid or the like is interesterified with an alkylene glycol or polyalkylene glycol having a molecular weight of up to 2000 or thereabouts. Frequently, dicarboxylic acids free of ethylenic unsaturation such as phthalic acid, isophthalic acid, tetrabromophthalic acid, chlorendic acid, adipic acid, succinic acid and the like may be employed within a molar range of 0.25 to as much as 15 moles per mole of the unsaturated dicarboxylic acid. It will be understood that the appropriate acid anhydrides when they exist may be used and usually are preferred when available.

The glycol or polyhydric alcohol component of the polyester is usually stoichiometric or in slight excess with respect to the sum of the acids. The excess of polyhydric alcohol seldom will exceed 20–25 percent and usually is about 10 to 15 percent.

These unsaturated polyesters may be generally prepared by heating a mixture of the polyhydric alcohol with the dicarboxylic acid or anhydride in the proper molar proportions at elevated temperatures, usually at about 150° to 225° C. for a period of time ranging from about 1 to 5 hours.

Polymerization inhibitors such as t-butyl catechol may be advantageously added. It is also possible to prepare unsaturated polyesters directly from the appropriate oxide rather than the glycol, e.g., propylene oxide may be used in place of propylene glycol. Generally, the condensation (polymerization) reaction is continued until the acid content drops to about 2 to 12 percent (—COOH) and preferably from 4 to 8 percent.

The following non-limiting examples further illustrate the present invention and certain of the resins used are identified as:

Resin A.—A vinyl ester resin prepared by reacting 0.5 equivalent of D.E.R. 331 (a liquid bisphenol A type polyepoxide having an epoxide equivalent weight of 186–192), 0.5 equivalent of D.E.R. 661 (a solid bisphenol A type polyepoxide having an epoxide equivalent weight of 475–575) and 1 equivalent of methacrylic acid. The resin is then reacted with about 3% of maleic anhydride.

Resin B.—A vinyl ester resin prepared by reacting 1 equivalent of D.E.R. 332 (a liquid bisphenol A type polyepoxide having an epoxide equivalent weight of 172–178) and 1 equivalent of the maleate half ester of β-hydroxyethyl acrylate (HEA-MA).

Resin C.—A vinyl ester resin is prepared by reacting 1 equivalent of D.E.R. 741 (a flexible polyglycol type polyepoxide having an epoxide equivalent weight of 364–380) and 1 equivalent of HEA–MA.

Resin D.—A vinyl ester resin prepared by reacting 0.5 eq. of HEA-MA, 0.3 eq. of the maleate half ester of hydroxypropyl acrylate, 0.2 eq. of methacrylic acid, 0.22 eq. of D.E.R. 661 and 0.78 eq. of D.E.R. 331.

Resin E.—A mixture of 3 parts of Resin B and 1 part of Resin C.

Resin F.—A vinyl ester resin prepared by reacting 1 eq. of the maleate half ester of hydroxypropyl acrylate (HPA-MA) with 1 eq. of D.E.R. 331. The resin is then reacted with 0.6 eq. of phthalic anhydride per equivalent of hydroxyl.

Example 1

A 200 gm. sample of Resin A was diluted to contain 45% by weight styrene and 3 gm. of benzoyl peroxide (BPO) added and blended. With stirring 184 gms. of water was added over a 45 second period forming a white, creamy, stable emulsion.

A ⅛″ thick casting was prepared from a portion of the emulsion by curing at 80° C. for 16 hours. The casting was then postcured at 250° F. for 45 minutes and had the following physical properties:

| | |
|---|---|
| Flexural strength, p.s.i. | 7600 |
| Flexural modulus×10⁵ | 2.53 |
| Tensile strength, p.s.i. | 3200 |
| Percent elongation | 1.69 |
| Heat distortion temp. ° F., 264 p.s.i. | 184 |

Another portion of the above emulsion was promoted with 0.5% dimethyl aniline (DMA) and mixed with sand to saturate the sand. The part cured in 5 minutes to a hard solid with the sand included in the matrix.

Example 2

Ten pounds of Resin B containing 40% by wt. styrene was mixed with 67 grams of BPO and then blended with 10 lbs. of water over a 1–2 minute period in a Cowles dissolver. Twenty-one gms. of DMA was added and blended and the emulsion poured into a polyethylene container. In 5 minutes the cured mass was easily lifted from the container with no sticking. The container contours were perfectly reproduced and the part was white with a smooth surface and dry to the touch.

Example 3

An emulsion was prepared from 50 parts of Resin B containing 40% by wt. styrene, 50 parts water, 0.75 part BPO and 0.25 part DMA promoter similar to the previous examples. A portion of this mix was molded into a 4 x ½ inch highway marker. After 15 minutes the part withstood repeated 30″ Gardner impact.

Example 4

Emulsions were prepared similar to the previous examples from Resin A, Resin B, Resin E and Resin F, each diluted to contain 40% by wt. styrene, by adding 1.5% BPO. Two emulsions of Resin A were prepared, one at 50% water and one at 40% water. Two emulsions of Resin B were prepared, one at 50% water and one at 30% water. An emulsion of Resin E and Resin F was prepared at 50% water and ⅛″ thick castings were prepared from each emulsion and cured at 80° C. for 16 hours. The physical properties are shown in Table I.

Example 5

Similar to the previous examples an emulsion was prepared from 50 parts of Resin A, 50 parts of water, 0.5 part BPO and 0.25 part DMA. Cured strips, ½″ x ½″ x 2½″ were prepared in about 5–10 minutes and tested for Izod impact. The average impact was 0.465 ft. lb./in. notch. In a similar test 10 parts of ¼″ chopped glass fiber (OCFM 832) were added. The Izod impact was 0.50 ft. lb./in. notch.

TABLE I

| | Resin A | | Resin B | | Resin F | |
|---|---|---|---|---|---|---|
| Weight percent water | 50% | 40% | 50% | 30% | 50% | 50% |
| Flexural strength, p.s.i. | 3,800 | 7,600 | 4,200 | | 3,600 | 4,100 |
| After 2 hrs. water boil, p.s.i. | 3,800 | 6,500 | 4,500 | 5,500 | 3,600 | 4,000 |
| Flexural modulus ×10⁵ | 1.43 | 2.35 | 1.33 | | 1.27 | 1.42 |
| After 2 hrs. water boil | 1.34 | 1.67 | 1.32 | | 1.16 | 1.58 |
| Tensile strength, p.s.i. | 2,200 | 3,200 | 2,480 | | 1,440 | 2,200 |
| Heat distortion temp., ° F. 264 p.s.i. | 193 | 194 | 145 | | 140 | 160 |

Example 6

The stability of the vinyl ester resin emulsions was evaluated in the following series of tests. In a manner similar to that of Example 1 emulsions were prepared from Resin A at 45, 50 and 60% styrene levels and in each case at 50% water; from Resin C at 40, 50 and 60% styrene levels and in each case at 50% water; and from Resin D at 50% styrene and 50% water. In every case the emulsions were found after 1 month storage to have the same emulsion qualities as on the day they were prepared. The test was conducted at 75° F.

For comparison two polyester resins commercially available as WEP-26 and WEP-42 (Ashland Chemical Co.) were prepared at a 50% water level. The WEP-26 emulsion broke into 2 phases in 16 hours and the WEP-42 emulsion broke into 2 phases in 10 hours. This test was also conducted at 75° F.

Example 7

A resin similar to that of Resin B was prepared wherein the maleate half ester of hydroxypropyl acrylate was used in place of the HEA-MA and the resin was diluted to contain 14.7% styrene and 27.0% monochlorostyrene. An emulsion prepared at 50% water with 1.5% BPO and 0.25% DMA cured to a white infusible solid in 10 minutes.

Example 8

When the surface of a cast part is exposed to the atmosphere a tacky surface may result due to atmospheric inhibition. This condition was eliminated when using emulsions as prepared in the previous examples by incorporating therein about 0.04% by wt. of paraffin wax or about 2% by wt. of zinc stearate. It has also been found that the emulsions can be tinted by the addition thereto of colorants such as raw sienna, raw umber, black iron oxide and a large variety of normal resin pigment.

Example 9

A series of emulsions was prepared from Resin A containing 40% by wt. styrene at 40, 50, 55 and 60 percent by wt. levels of water. Each was catalyzed with 1.5% BPO and promoted with 0.2% DMA. Castings ⅛" thick were cured at room temperature for 16 hours and post cured at 80° C. for 45 minutes. The physical properties are shown below:

| Water level | 40% | 50% | 55% | 60% |
|---|---|---|---|---|
| Flexural strength, p.s.i. | 5,200 | 4,610 | 4,020 | 3,560 |
| After 2 hrs. water boil | 6,000 | 4,500 | 4,100 | 3,500 |
| Flexural modulus, ×10⁵ | 2.33 | 1.79 | 1.16 | 1.07 |
| After 2 hrs. water boil | 1.75 | 1.34 | 1.12 | 0.92 |
| Tensile strength, p.s.i. | 3,400 | 2,450 | 1,880 | 1,410 |
| Heat distortion temp. ° F, 264 p.s.i. | 185 | 183 | 177 | 167 |
| Compressive strength (failure), p.s.i. | 7,230 | 4,720 | 3,540 | 2,650 |
| Yield, p.s.i. | 4,810 | 3,530 | 2,830 | 2,300 |
| 24 hour absorption, wt. percent: | | | | |
| Toluene | 0.98 | 2.09 | 4.77 | 3.42 |
| Water | 0.14 | 0.17 | 0.52 | 0.32 |
| Viscosity before gelation, cps. (20 r.p.m. No. 4, RVT Brookfield) | 3,100 | 5,200 | 7,600 | 9,700 |

The water extended, thermosettable resins of this invention may be admixed with a variety of inert materials and reinforcing media such as clays, sand, glass fibers, pigments, and the like. The resulting water-in-resin emulsion may be used for potting and casting and in the preparation of pottery, plaques, statues, furniture, stabilization of sand, soil and the like and is of particular value in preparing large or massive articles. Further the resins are especially useful in preparing flame retardant articles due to the presence of the water in the cured resin. Additionally, flame retardancy can be enhanced by the appropriate selection of reactants such as brominated polyepoxide resins or by the addition of other flame retardant additives such as chlorostyrene and the like.

What is claimed is:

1. A water extended thermosettable resin composition comprising a water-in-resin emulsion of from about 30 to 70 weight percent of water and correspondingly from about 70 to 30 weight percent of a resin phase which forms said emulsion without the need of an emulsifying agent; said resin phase comprising from about 40 to 70 weight percent of a vinyl ester resin and from about 60 to 30 weight percent of a water insoluble vinyl monomer copolymerizable therewith; said vinyl ester resin prepared by reacting about equivalent proportions of an unsaturated monocarboxylic acid and a polyepoxide resin, and said vinyl ester resin containing

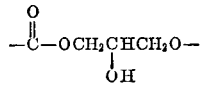

linkage groups and terminal vinylidene groups attached to the ester end of said linkage, and wherein said polyepoxide resin is a compound containing more than one oxirane group per molecule.

2. The resin composition of claim 1 wherein said polyepoxide resin is a glycidyl polyether of a polyhydric phenol or polyhydric alcohol.

3. The resin composition of claim 1 wherein said acid is acrylic acid, methacrylic acid or a dicarboxylic acid half ester of a hydroxyalkyl acrylate or methacrylate, said hydroxyalkyl group containing from 2 to 6 carbon atoms.

4. The resin composition of claim 1 wherein said vinyl ester resin has been further reacted with from about 0.1 to 0.6 moles of a dicarboxylic acid anhydride per equivalent of hydroxyl group in said vinyl ester resin.

5. The resin composition of claim 1 wherein said vinyl monomer is a vinyl aromatic monomer or a saturated alcohol ester of acrylic or methacrylic acid.

6. The resin composition of claim 5 wherein said vinyl monomer is styrene.

7. A thermoset resin containing therein dispersed droplets of water wherein said resin comprises the polymerized emulsion of claim 1.

8. A thermoset resin containing therein dispersed droplets of water wherein said resin comprises the polymerized emulsion of claim 4.

9. A water extended thermosettable resin composition comprising a water-in-resin emulsion of from about 30 to 70 weight percent water and correspondingly from about 70 to 30 weight percent of a resin phase which forms said emulsion without the need of an emulsifying agent; said resin phase comprising from about 40 to 70 weight percent of a vinyl ester resin/unsaturated polycarboxylic acid polyester resin composition, wherein the weight ratio of said polyester to said vinyl ester resin ranges up to about 2:3 and from about 60 to 30 weight percent of a water insoluble vinyl monomer copolymerizable therewith; said vinyl ester resin prepared by reacting about equivalent proportions of an unsaturated monocarboxylic acid and a polyepoxide resin, said vinyl ester containing

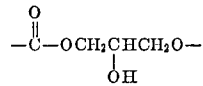

groups and terminal vinylidene groups, attached to the ester end of said linkage, and wherein said polyepoxide resin is a compound containing more than one oxirane group per molecule.

10. The resin composition of claim 9 wherein said vinyl ester/unsaturated polyester resin composition is prepared by reacting a polyepoxide resin with an unsaturated, monocarboxylic acid in the presence of an unsaturated polyester resin wherein said polyepoxide resin is a compound having more than one oxirane group per molecule.

11. The resin composition of claim 9 wherein said polyepoxide resin is a glycidyl polyether of a polyhydric phenol or polyhydric alcohol.

12. The resin composition of claim 9 wherein said acid is acrylic acid, methacrylic acid or a dicarboxylic acid half ester of a hydroxyalkyl acrylate or methacrylate, said hydroxyalkyl group containing from 2 to 6 carbon atoms.

13. The resin composition of claim 9 wherein said vinyl monomer is a vinyl aromatic monomer or a saturated alcohol ester of acrylic or methacrylic acid.

14. The resin composition of claim 13 wherein said vinyl monomer is styrene.

15. A thermoset resin containing therein dispersed droplets of water wherein said resin comprises the polymerized emulsion of claim 9.

16. A thermoset resin containing therein dispersed droplets of water wherein said resin comprises the polymerized emulsion of claim 10.

References Cited

UNITED STATES PATENTS

| | | | |
|---|---|---|---|
| 3,591,191 | 7/1971 | Coderre et al. | 260—29.6 NR X |
| 3,256,226 | 6/1966 | Fekete et al. | 260—837 R X |
| 3,256,219 | 6/1966 | Will | 260—2.5 |
| 3,301,743 | 1/1967 | Fekete et al. | 260—86.1 R X |
| 3,367,992 | 2/1968 | Bearden | 260—37 R X |
| 3,255,127 | 6/1966 | Von Bonin et al. | 260—29.6 NR X |
| 3,442,842 | 5/1969 | Von Bonin | 260—29.6 NR X |
| 3,437,619 | 4/1969 | Nutt | 260—29.2 X |

WILLIAM H. SHORT, Primary Examiner

E. A. NIELSEN, Assistant Examiner

U.S. Cl. X.R.

260—29.6 WQ, 837 R

PO-1050
(5/69)

UNITED STATES PATENT OFFICE
CERTIFICATE OF CORRECTION

Patent No. 3,792,006  Dated February 12, 1974

Inventor(s) Daniel J. Najvar

It is certified that error appears in the above-identified patent and that said Letters Patent are hereby corrected as shown below:

Column 2, line 69, "vinyliden" should be --vinylidene--.

Column 6, in Table I, over the last two columns, the headings should be "Resin E" and "Resin F". The last portion of the table is reproduced below:

| Resin E | Resin F |
|---------|---------|
| (50%)   | (50%)   |
| 3600    | 4100    |
| 3600    | 4000    |
| 1.27    | 1.42    |
| 1.16    | 1.58    |
| 1440    | 2200    |
| 140°    | 160°    |

Signed and sealed this 9th day of July 1974.

(SEAL)
Attest:

McCOY M. GIBSON, JR.
Attesting Officer

C. MARSHALL DANN
Commissioner of Patents